Jan. 26, 1937.  E. G. BRIDGES  2,069,130
GLASS BLOWING MACHINE
Original Filed June 4, 1917   10 Sheets-Sheet 1

Inventor
By Edward G. Bridges,
Emery, Booth, Janney & Varney
Attorneys.

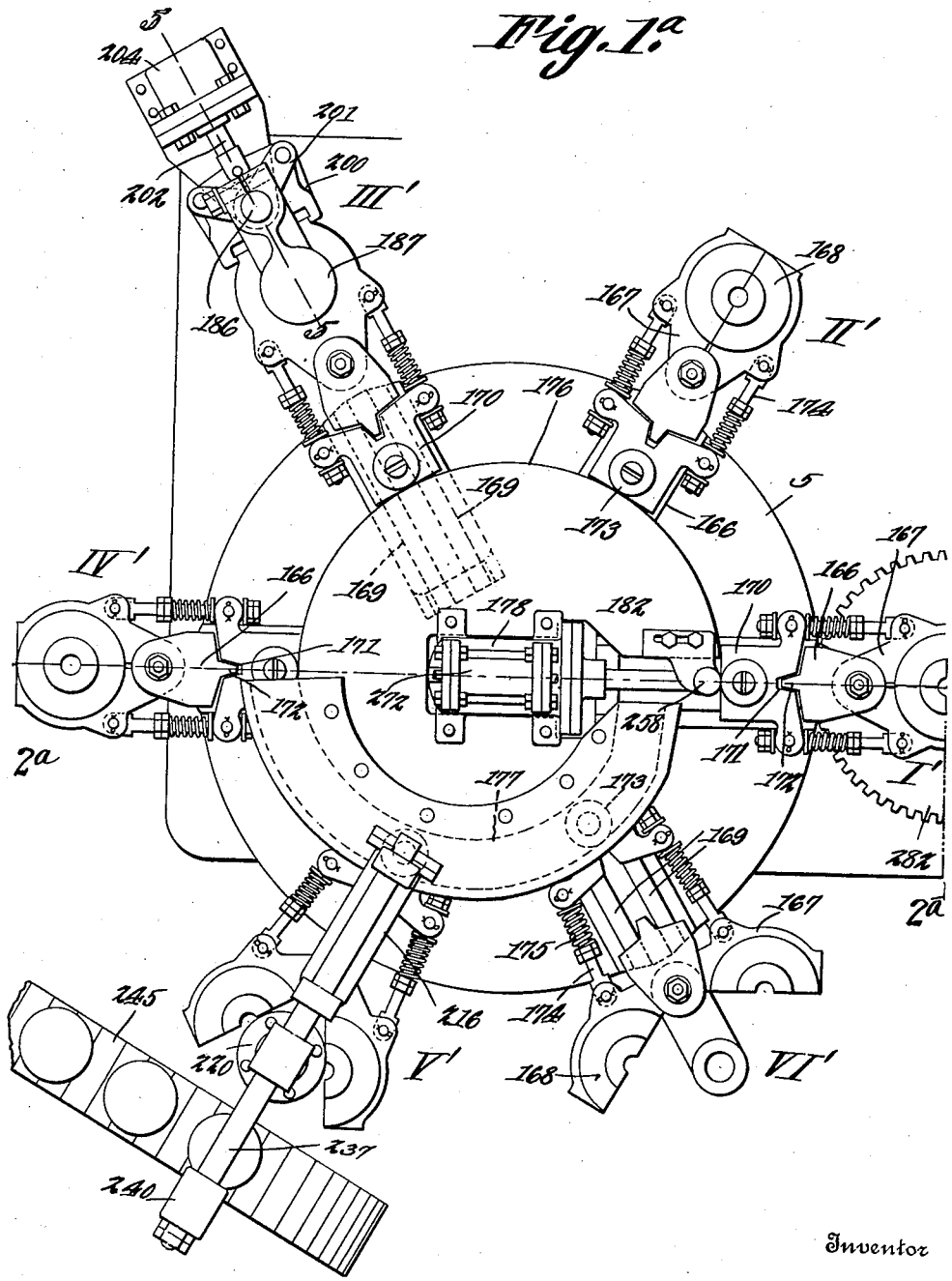

Jan. 26, 1937. E. G. BRIDGES 2,069,130
GLASS BLOWING MACHINE
Original Filed June 4, 1917 10 Sheets-Sheet 3
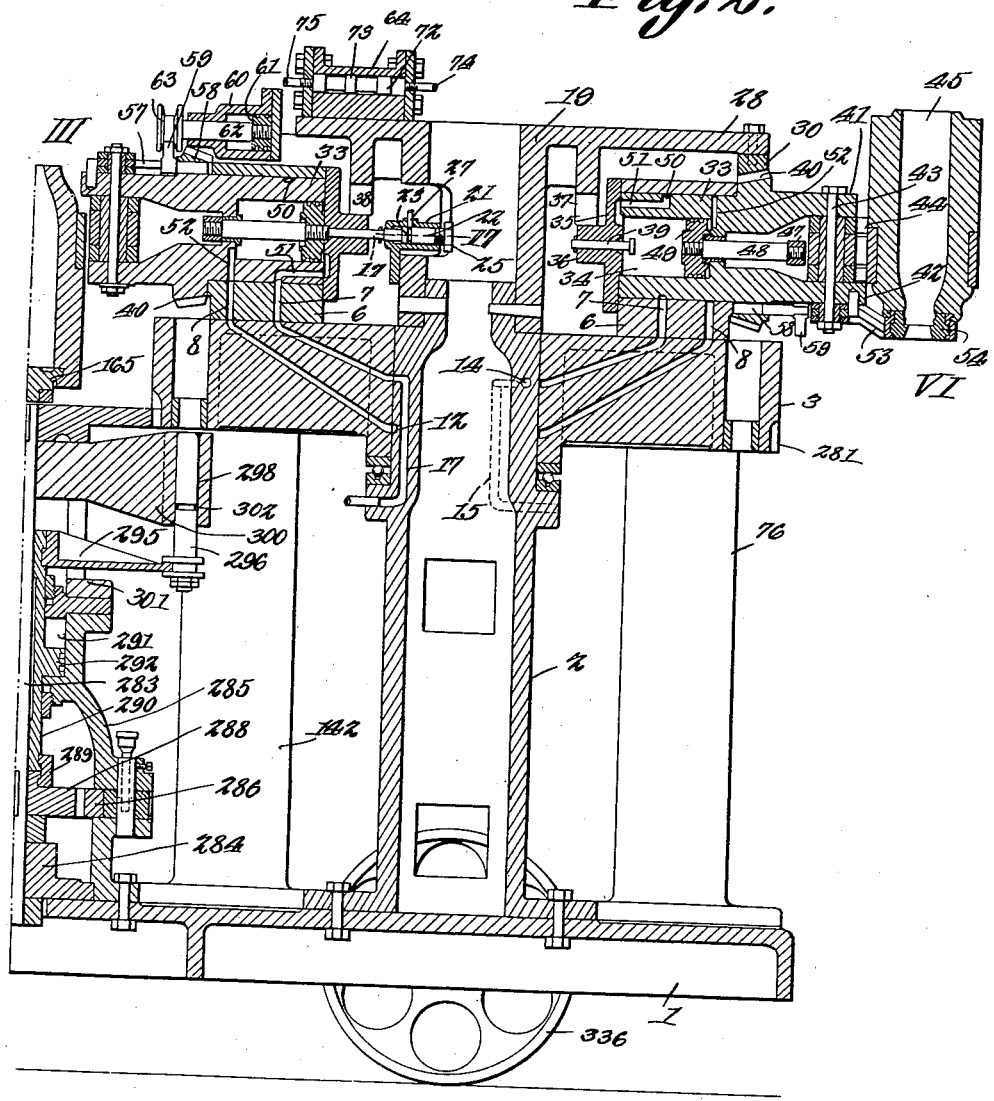
Inventor
Edward G. Bridges,
By Emery, Booth, Janney & Varney
Attorneys.

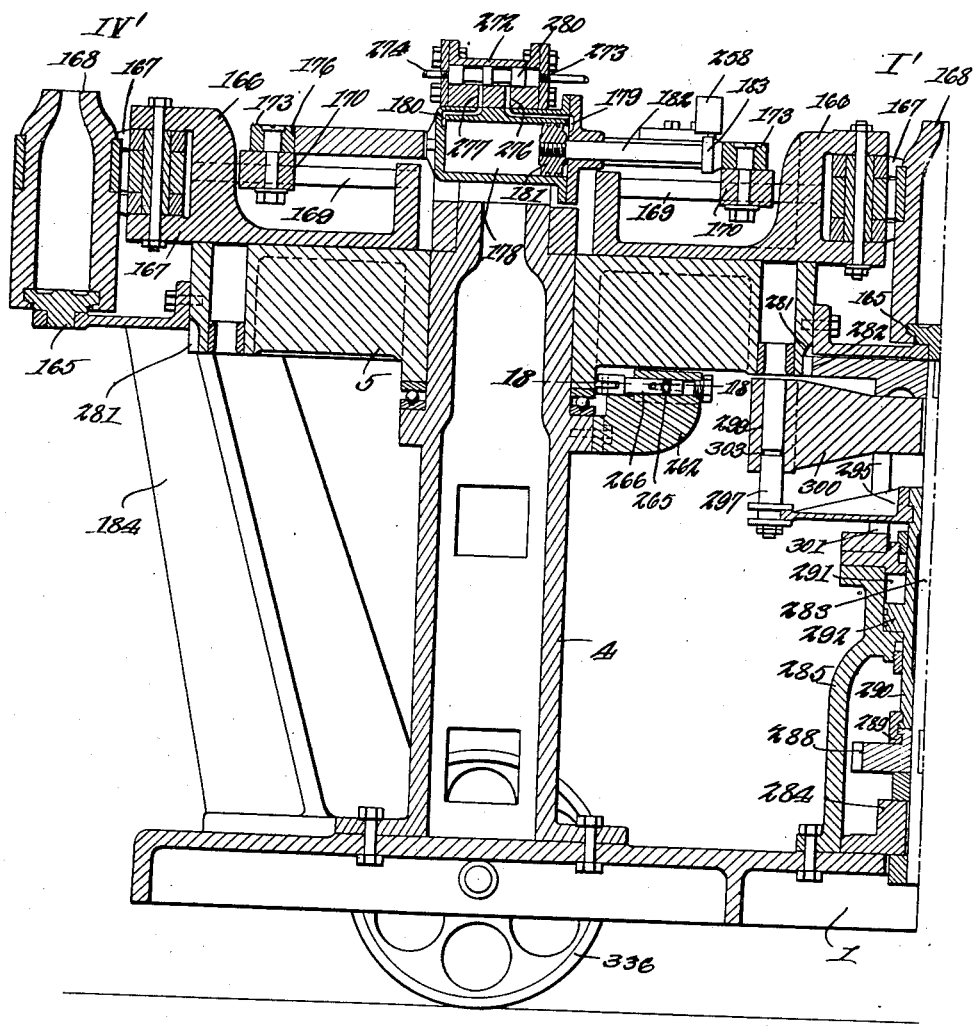

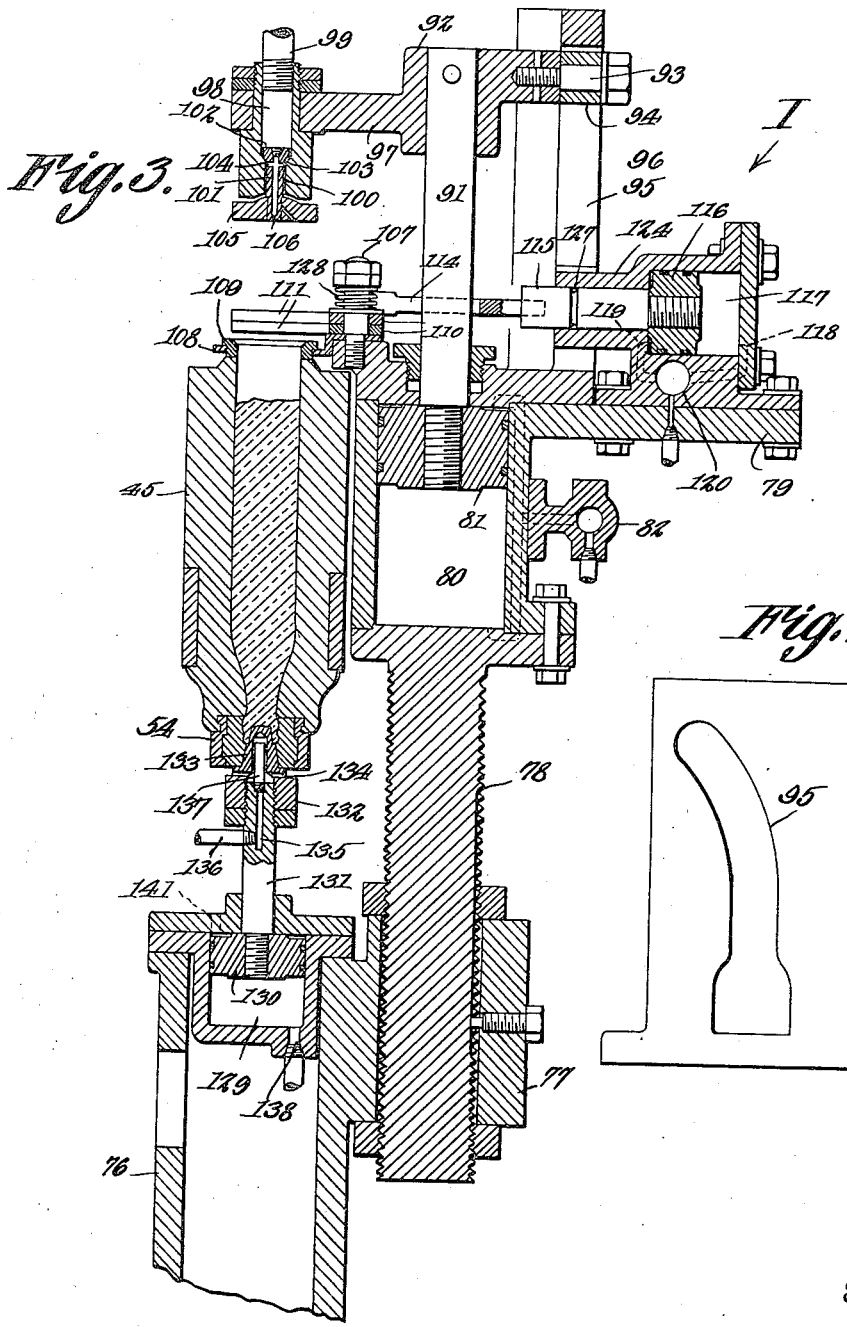

Jan. 26, 1937.  E. G. BRIDGES  2,069,130
GLASS BLOWING MACHINE
Original Filed June 4, 1917    10 Sheets-Sheet 6

Inventor
Edward G. Bridges,
By Emery, Booth, Janney & Varney
Attorneys.

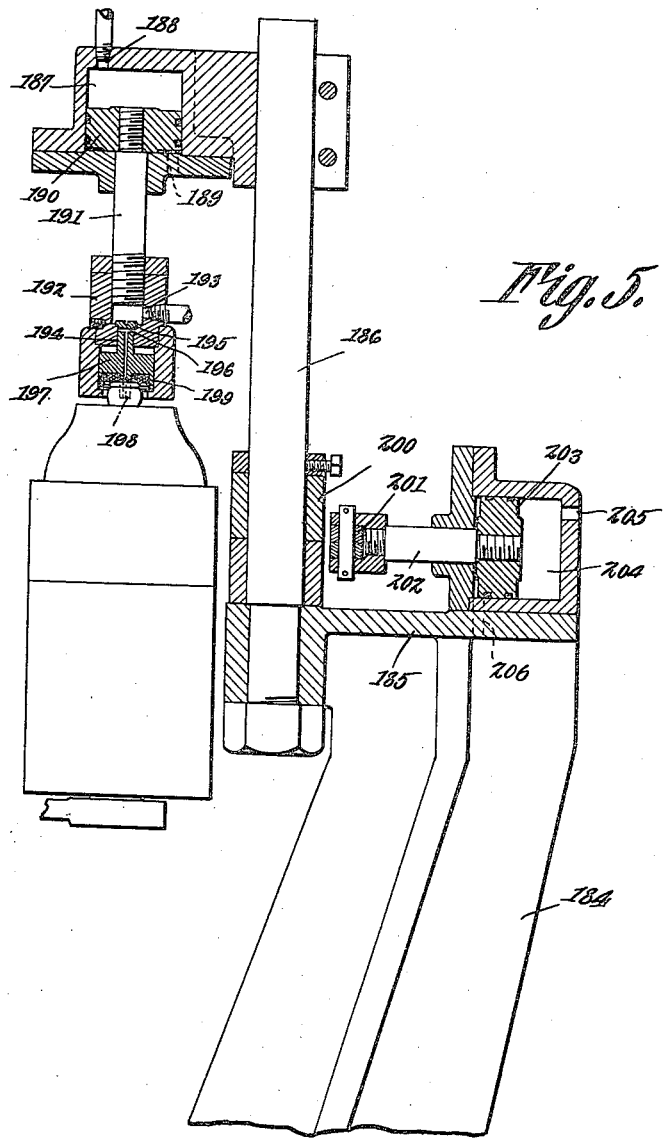

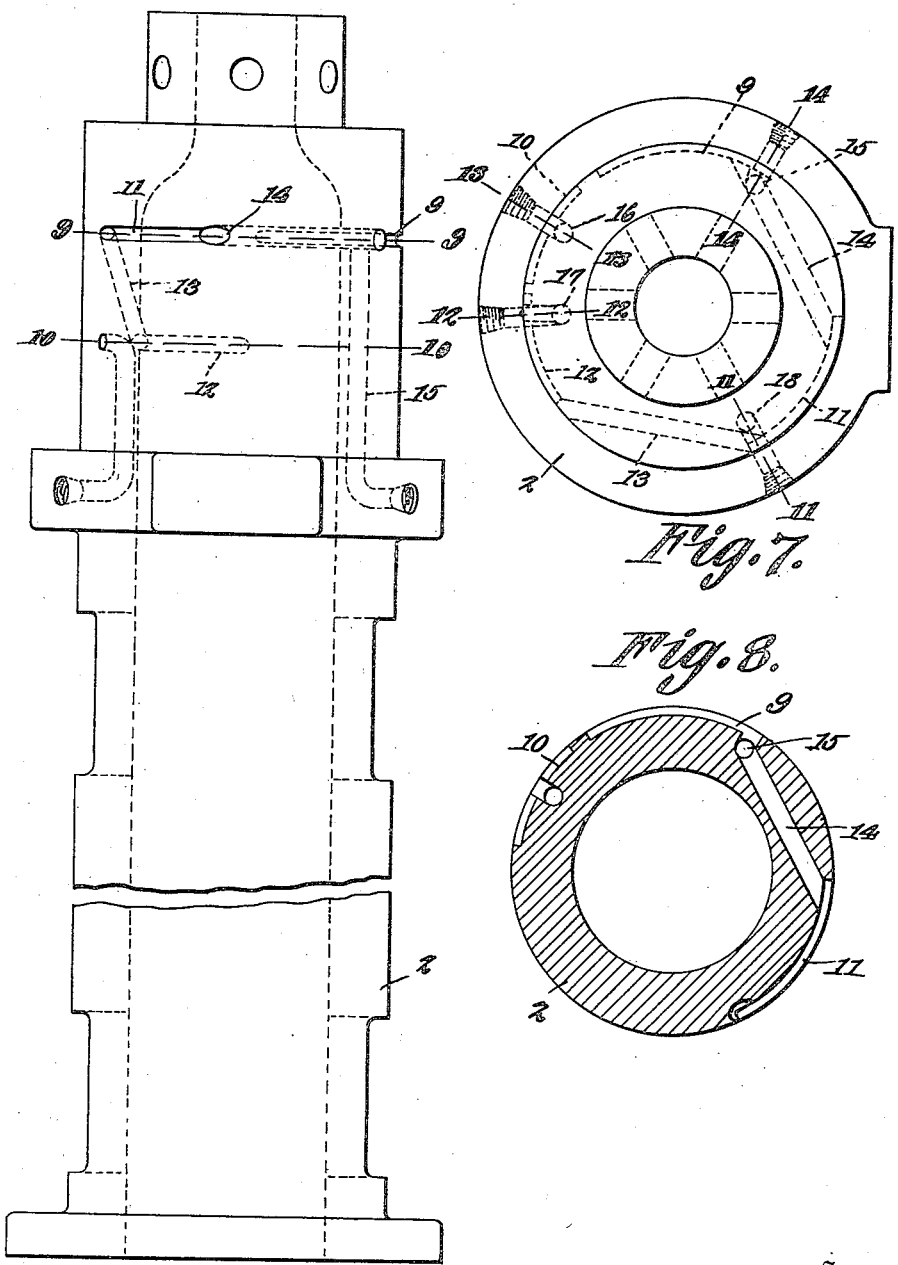

Jan. 26, 1937.  E. G. BRIDGES  2,069,130
GLASS BLOWING MACHINE
Original Filed June 4, 1917   10 Sheets-Sheet 9

Inventor
Edward G. Bridges,
By Emery, Booth, Janney & Varney
Attorneys.

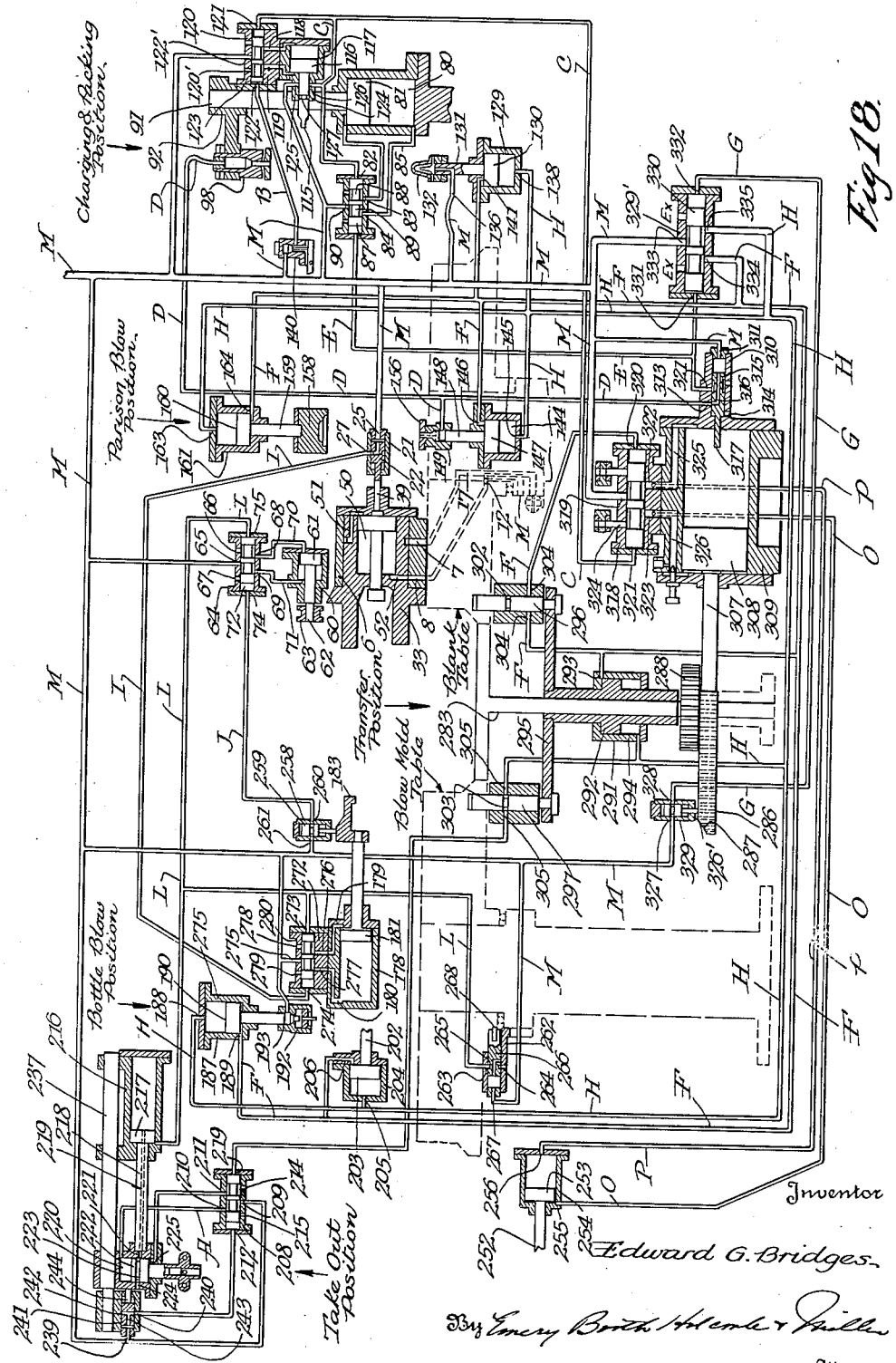

Patented Jan. 26, 1937

2,069,130

UNITED STATES PATENT OFFICE 2,069,130

GLASS BLOWING MACHINE

Edward G. Bridges, Anderson, Ind., assignor, by mesne assignments, to Lynch Corporation, a corporation of Indiana Original application June 4, 1917, Serial No. 172,678. Divided and this application July 16, 1927, Serial No. 206,306. In Germany April 15, 1920

49 Claims. (Cl. 49—9)

This invention relates to a machine for blowing glass bottles and other articles and aims to provide automatic means for completing the article from a drop or "gather" or molten glass that may be fed to the machine automatically or by a workman. One of its objects is to provide a machine having separate tables mounted for rotation and designed to carry the blank molds and the blow molds respectively, said molds cooperating so as to transfer a blank from the blank mold to a blow mold.

A further object is to provide a machine of this character in which the blank is carried to a point where the transfer is effected by the blow mold on one table closing about said blank while it is suspended by a neck ring.

A further object is to provide revoluble tables both of which receive power from an interposed gear so that no loss of motion will occur as would be the case should motion be transmitted through either of the tables to the other.

A still further object is to provide novel means for mounting the blank molds whereby said molds will be opened and closed and bodily inverted, and subsequently restored to their normal positions during each complete rotation of the table supporting the blank molds.

Another object is to provide pneumatic means controlled by the inversion and restoration of the blank for holding the members of the blank mold closed and for opening them at predetermined points during the progress of the mold with the rotating table.

A further object of the invention is to improve the construction of the mold mechanisms and actuating means therefor to simplify the automatic transfer of a glass parison from a blank mold to a blow mold.

A still further object of the invention is to improve automatic glassware forming machines whereby the glass parison may be transferred from a blank mold to a blow mold and be retained therein for subsequent final blowing in said blow mold, permitting a reheating time interval between the transfer and the final blowing operation, during which the chilled skin of the parison may be reheated to satisfactory blowing temperature.

Other minor objects of the invention will appear to those skilled in the art from a consideration of the following description of the invention when considered in connection with the accompanying drawings illustrating a machine embodying the invention and designed for hand feeding.

In said drawings:

Fig. 1a is a corresponding view of the blow table and the corresponding parts.

Fig. 2 is a central vertical section on line 2—2 through the structure shown in Fig. 1.

Fig. 2a is a central vertical section on line 2a—2a through the structure shown in Fig. 1a.

Fig. 3 is a section on line 3—3 of Fig. 1.

Fig. 5 is a section on line 5—5 of Fig. 1a.

Fig. 6 is an elevation of the pedestal or stand of the blank table.

Fig. 7 is a plan view of the structure shown in Fig. 6.

Fig. 8 is a section on line 9—9 of Fig. 6.

Fig. 14 is an elevation of the blow head guide at the first station of the blank mold.

Fig. 17 is a section through the cam actuated valve at the transfer station of the blow table, said section being taken on the line 18—18 of Fig. 2a.

Fig. 18 is a diagrammatic view of the complete machine, the parts being arranged and shown in sectional elevation.

Figure 1:
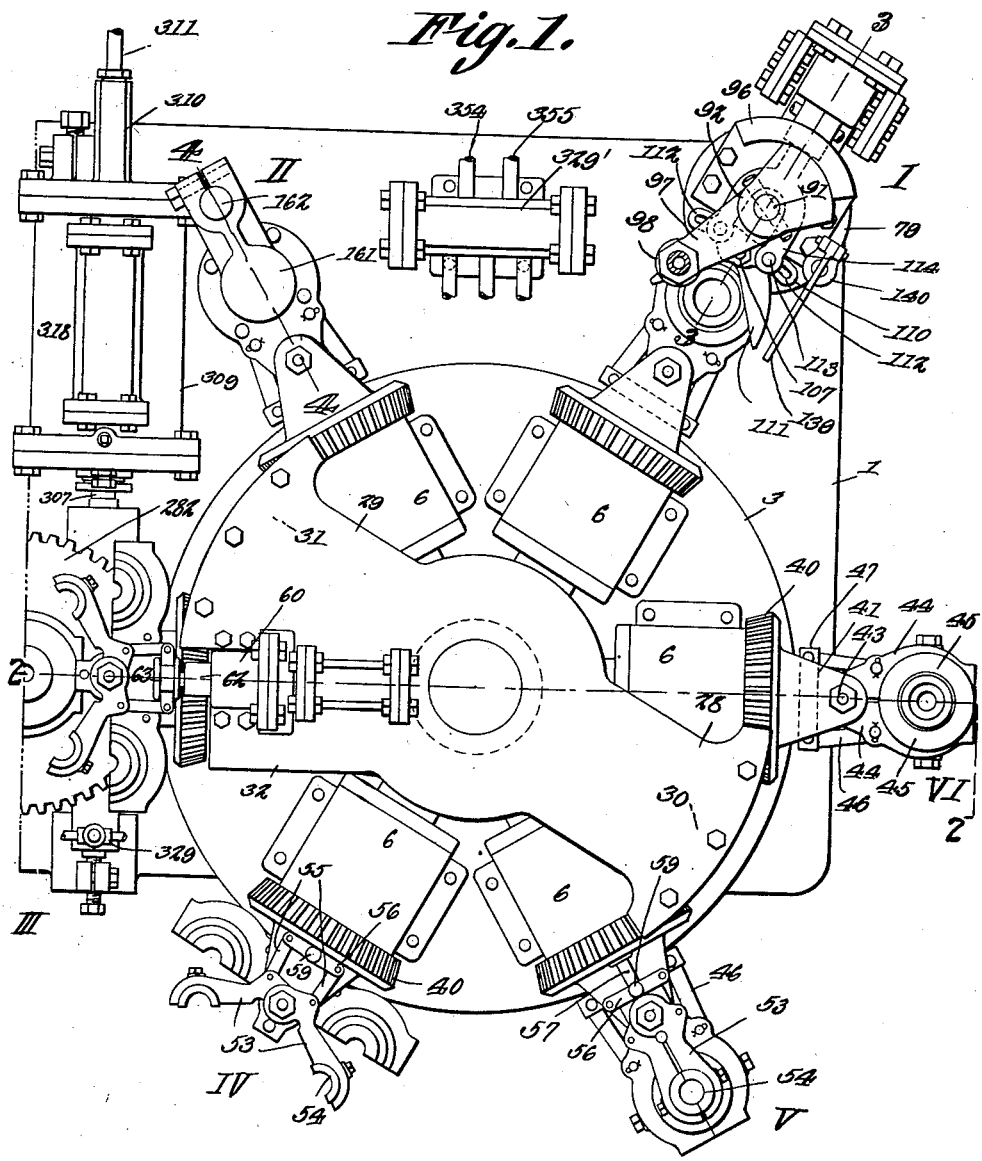
Fig. 1 is a plan view of the blank table and cooperating parts.

The subject matter of the present invention relates primarily to the construction and mounting of the blank molds and blow molds, as well as the manipulation of them to permit the automatic transfer of the glass parison from one to the other. In the case of a two-table machine, i. e. wherein the blank and blow molds are mounted on separate laterally spaced tables, this permits of the final blowing of the bottle at a position beyond the transfer position.

The invention is illustrated in a machine corresponding exactly to the machine illustrated in my copending application with James W. Lynch, filed June 4, 1917, Serial No. 172,678, now Patent No. 1,788,312, granted January 6, 1931, of which the present application is a division, and reference is made to that patent for a more complete illustration of certain details of construction, such as the parison fabricating devices, the operating mechanism, and the takeout mechanism, referred to herein but which do not form a part of the subject matter claimed herein.

The present invention is preferably embodied in a machine of the two-table type, such as illustrated herein. As illustrated, such machine may be mounted on a base 1, at one end of which is erected a pedestal or column 2 designed to support a blank mold table or carrier 3. A similar pedestal or column 4 is erected on the base adjacent the other end thereof and is designed to support the blow mold table 5. The blank table 3 is adapted to carry several blank molds hereinafter more fully described and which can be of any number desired. In the present instance six of these blank molds have been connected to the table 3, and each of the blank molds, during one complete rotation of the blank table, is adapted to stop at six distinct stations indicated at I, II, III, IV, V, and VI, respectively. All of the blank molds are of the same construction, and they all operate successively in the same manner so that in describing the construction and operation of one mold it is to be understood that the same description applies to all of the molds on the blank table.

Blank table and support

Each blank mold unit (see Figs. 1 and 2) carried by the table includes a hollow bearing member 6 having separate air passages 7 and 8 extending downwardly therethrough and thence downwardly and inwardly within the table so as to be opened and closed at certain points during the rotation of the table about the stand or pedestal 2 by the wall of said pedestal.

Figure 9:
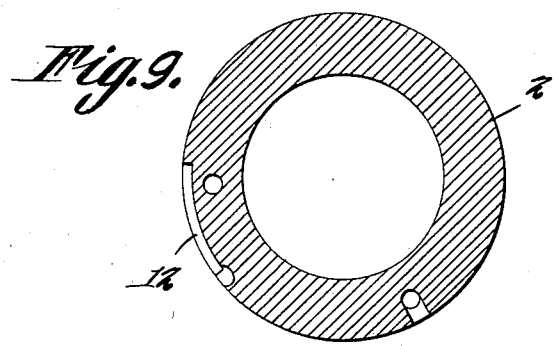
Fig. 9 is a section on line 10—10 of Fig. 6.

Formed within the upper portion of the pedestal and in the same horizontal plane are three grooves 9, 10 and 11, (see Figs. 2, 6, 7 and 8) which are designed successively to register with the lower or inner end of the upper passage 7 during the rotation of the table. The groove 9 is so located that it will register with the passage 7 for closing the blank mold just prior to its arrival at station I, while the blank mold is at said station I, and also during the movement of the blank mold from station I to station II. The groove 10 is adapted to register with the passage 7 immediately after the blank mold leaves station II. Passage 7 remains in communication with the groove 10 until just prior to the arrival of the blank mold at station III at which time the lower passage 8 comes into register with a short lower groove 12 (Figs. 6, 7 and 9) in the stand or pedestal 2. This lower groove is in communication through an inclined passage 13 with the third upper groove 11 and remains in communication with the passage 8 until after the blank mold has left its station III and has almost reached its station IV. As the blank mold reaches its station V the upper passage 7 comes into communication with the groove 11 and this groove is in communication, through oblique passage 14 with the groove 9. The groove 9 is adapted to receive pressure through a vertical bore 15 and another vertical bore 16 is adapted to direct pressure into the groove 10. Thus it will be seen that when air under pressure is directed into these two bores, the uniform pressure of air will be maintained in the grooves 9, 10, 11 and 12.

When the blank mold is at station III the upper passage 7 will communicate with an exhaust bore 17 (Fig. 7) formed in the stand or pedestal 2. Another exhaust bore 18 is formed in the stand or pedestal 2 and is adapted to register with the inner end of the lower passage 8 when the blank mold arrives at its station V.

Figure 16:
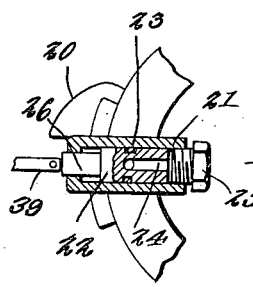
Fig. 16 is a section on line 17—17 in Fig. 2 and showing the stationary valve at the delivery station of the blank mold.
Figures 10, 11, 12, 13:
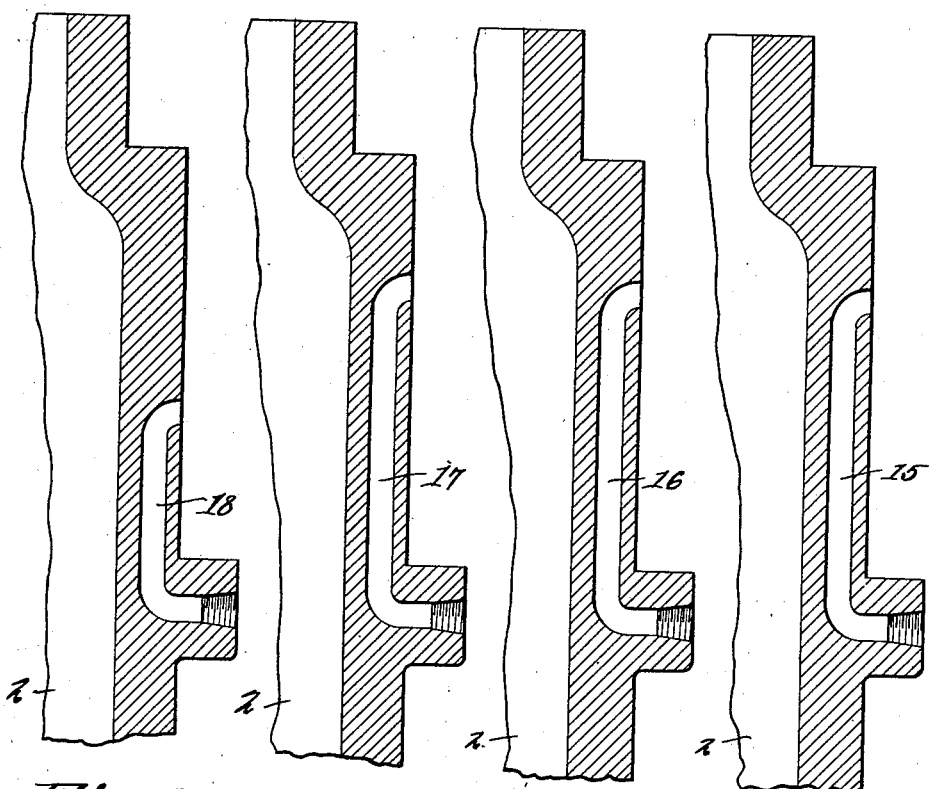
Fig. 10 is a section on line 11—11 of Fig. 7.
Fig. 11 is a section on line 12—12 of Fig. 7.
Fig. 12 is a section on line 13—13 of Fig. 7.
Fig. 13 is a section on line 14—14 of Fig. 7.

Secured to and extending upwardly from the stand or pedestal 2 is a tubular extension 19 constituting a cam track (see Fig. 2) there being formed on or secured to this extension along a radial line extending between stations II and III a cam 20 (Fig. 16). Connected to this cam track on a radial line extending through station III of the blank mold is a valve casing 21 in which a valve 22 is mounted to reciprocate, this valve being provided with an annular groove 23 near its outer end and which groove communicates with a central bore 24 extending into the valve from its inner end. Thus when pressure from the main air line is directed against the inner end of the valve through a pressure port 25, the valve will be shifted against the opposite end of its casing 21 and the stem 26 of the valve will be pressed outwardly from the surface of the track or extension 19. When the valve is in this position, the groove 23 is out of register with an outlet port 27 (see Fig. 18).

Formed with or connected to the upper end of the track or extension 19 are oppositely extending segmental wings 28 and 29, (see Fig. 1) the wing 28 being arranged above the blank table 3 between stations V and VI while the peripheral portion of the wing 29 is arranged above the blank table 3 and extends over the space between stations II and III. Connected to or formed with the bottom face of the wing 28 (see Fig. 2) is an arcuate rack 30 while another rack 31 is arranged on the bottom face of the peripheral portion of the wing 29. The wing 29 has an extension 32 (see Fig. 1) which is arranged back from the rack on the wing 29 and extends over the table 3 at station III. These wings are of course fixed relative to the stand or pedestal 2 and the racks serve as operating means for the revoluble cylinders as will be hereinafter pointed out, while the wing 29 constitutes a support for the portion of the transfer mechanism to be described hereinafter.

Blank mold inverting mechanism

Figure 15:
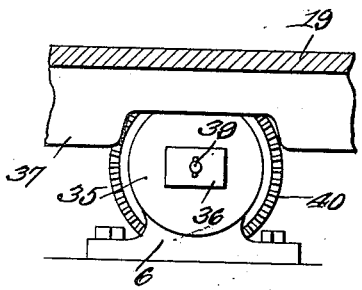
Fig. 15 is a rear elevation of the holding block of one of the blank molds, and portions of the adjacent molds cooperating therewith.

Journaled within each of the bearing members 6 is a cylinder 33 (see Fig. 2) having a piston chamber in its inner end as indicated at 34 and the inner end of this piston chamber is closed by a head 35 from the center of which projects an angular boss 36 (see Figs. 2 and 15). This boss is provided with diametrically opposed flat faces parallel with each other and one of these faces is adapted, during the movement of the blank mold from station VI to station II to ride along the lower edge of a track 37 depending from the top portion of the extension 19. Thus during this portion of the movement of the blank mold about the stand or pedestal 2 the cylinder 33 cannot rotate about its longitudinal axis and such rotation can only occur after the boss 36 has passed out of engagement with the lower edge of the track 37. Another similar depending track 38, (see Fig. 2) extends downwardly from the upper portion of the extension 19 and located between stations III and V, and is adapted to be engaged by the other flat face of the boss after the revoluble cylinder has been turned one half revolution as hereinafter described, thus to hold the revoluble cylinder against movement out of the position to which it has been turned.

Slidably mounted in the cylinder head 35 is a plunger 39 (see Fig. 2) and this plunger is adapted, when the blank mold is brought to station III, to aline with the stem 26 of valve 22, said plunger being pressed outwardly into the piston chamber 34 by coming against the cam 20 (see Fig. 16) just prior to the arrival of the plunger 39 at station III. Formed on or secured to the cylinder 33 close to the outer face of the bearing member 6 is a gear 40 adapted, during each complete rotation of the blank table to successively engage the racks 30 and 31, it being understood that each rack is so proportioned relative to the gear that it will cause the gear to make a one half revolution while passing from one end to the other of the rack. Extending from the outer face of the gear 40 (see Figs. 1 and 2) are upper and lower ears 41 and 42 and these ears are connected by a pivot pin 43 on which are mounted arms 44 extending from the opposed members 45 of the blank mold. Pivotally connected to each of the arms 44 adjacent the center thereof and close to its mold member 45 is a link 46, and the two links of the mold being extended inwardly and attached to a cross head 47 which extends between the upper and lower ears 41 and 42. This cross head is attached at its center to the rod 48 of the piston 49 mounted to reciprocate in the cylinder chamber 34. An annular groove 50 is formed in the cylinder 33 and constantly communicates with the passage 7. A passage 51 extends longitudinally within the wall of cylinder 33 and connects the groove 50 with the inner end of the cylinder where it opens through a port into the inner end of the piston chamber 34. A port 52 is formed in the outer end portion of the cylinder 33 and is adapted, when the cylinder is rotated through 180°, to come into register with the upper end of the passage 8 thus to direct air under pressure from said passage against the outer face of the piston 49.

Assuming that air under pressure is supplied to the bores 15 and 16 (see Figs. 2, 6, 7, 12 and 13) and is thus distributed to the grooves as hereinbefore described, it will be apparent that when the blank mold arrives at station I the passage 7 and groove 9 will direct pressure by way of groove 50 and passage 51 to the back face of the piston 49 with the result that said piston will be directed outwardly against the outer end of the chamber 34 and the links 46 will press against the arms 44 to hold the mold members tightly together. As the blank mold moves from station I to station II the pressure against the piston 49 will be maintained through the groove 9. Immediately after the blank mold leaves station II the gear 40 will engage the rack 31 so as to rotate the cylinder through 180°, thereby to invert the blank mold pressure being maintained back of the piston 49 during this rotation through the annular groove 50. Just as the cylinder completes its half revolution about its longitudinal axis the port 52 will be brought into register with passage 8 so that pressure through groove 12 will thus be directed against the outer face of the piston 49 and said piston driven inwardly so as to pull on links 46 and move the mold members 45 apart. During this inward movement of the piston the passage 7 has been brought into register with the exhaust bore 17. The groove 12 through which pressure is distributed to the outer face of the piston 49 when the mold is at station III, continues to direct pressure against said piston until just prior to the arrival of the mold at station IV. When the mold arrives at station V, the passage 8 comes into register with the exhaust bore 18 and the passage 7 comes into register with the groove 11 so that pressure is directed from said groove 11 and the passage 7 to the back face of the piston 49 with the result that the members of the blank mold are swung together and are maintained in this position while the mold is moving from position V to position I. Pressure is maintained against the piston while the mold is moving from position V to position VI and during this stage of the movement of the mold the gear 40 comes into mesh with the rack 30, thus causing a one half revolution of the cylinder 33 so that when the cylinder arrives at station I it will have the same position as when it started its cycle of movement.

*Neck ring*

Pivotally mounted on one end portion of the pin 43 (see Figs. 1 and 2) are oppositely extending jaws 53 to the outer ends of which are attached segmental members 54 constituting the sections of the neck rings. These sections are adapted to close together at the neck end of the blank mold and are adapted to be surrounded by a portion of the blank mold as is usual in devices of this character. Connected to the jaws 53 between their ends are links 55 and these links are in turn attached to a cross head 56 which has a guide pin 57 slidably mounted in an opening 58 formed in the gear 40. A lug 59 projects from the cross head 56 and extends downwardly when the mold is at station I but projects upwardly when the mold is at station III. When the lug and cross head are at their outermost positions, the links 55 press against the jaws 53 and hold the members of the neck ring closed together, but when the lug 59 and its cross head are drawn inwardly the members of the neck rings are shifted away from each other.

Mounted on the extension 32 of the wing 29 at station III is a cylinder 60 containing a piston 61 from which projects a stem 62. Connected to the outer end of this stem is a spool 63 and this spool is designed to be held at its outermost position under normal conditions so that when the blank mold arrives at station III the lug 59 will enter the groove in the spool.

Mounted on the wing 29 is a valve casing 64, (see Figs. 2 and 18) this casing being provided with a pressure inlet port 65, exhaust ports 66 and 67, and outlet ports 68 and 69. The outlet port 68 is located between the inlet port 65 and the exhaust port 66, while the outlet port 69 is located between the inlet port 65 and the exhaust port 67. Constant pressure is directed against the port 65 and the outlet port 68 communicates with the inner end of the cylinder 60 through a passage 70. A passage 71 connects the outer end of the cylinder 60 to the outlet port 69.

A valve 72 is mounted to reciprocate within the casing 64 and has a centrally enlarged portion 73 adapted to normally close the port 65 and also having enlarged end portions or heads. These heads are adapted to alternately close the exhaust ports 66 and 67. A pressure inlet port 74 is formed in the inner end of the valve casing 64 and another pressure inlet port 75 is formed in the outer end of the valve casing. Thus it will be seen that when pressure is directed through port 74 against the valve 72, which action will take place when the mold reaches station III, the inlet port 65 will be placed in communication with the outlet port 69 while the outlet port 68 will be placed in communication with the exhaust port 66. Thus air under pressure will flow through the passage 71 and against the outer face of the piston 61, forcing said piston inwardly and causing the spool to pull the lug 59 inwardly and move the members of the neck ring away from each other.

The foregoing operation is preferably so timed relative to the opening of the blank mold at station III that the members of the neck ring will not open out until after the members of the blank mold have become disengaged from the glass article and the members of the blow mold hereinafter referred to have engaged the article.

It may be stated at this time that when the members of the blank mold are moved apart at station III the piston 49 will strike the plunger 39 (Fig. 16) and force it against the stem 26 of valve 22 thus causing said valve to shift inwardly and bring the pressure inlet 25 into communication with the outlet port 27. This will control certain other operations as will be hereinafter pointed out.

Blow head

The glass in the parison mold may be advantageously fabricated by first compacting the charge around a mouth-forming pin mechanism at or adjacent the charging position and thereafter counterblowing the charge to form a hollow parison, as for example at station II.

The blank settling mechanism may be mounted on the base 1 adjacent station I on a standard 76 (see Fig. 3) having a laterally extending sleeve 77 in which is slidably mounted a post 78 which can be adjusted to any desired elevation and held by a set screw or in any other approved manner.

Mounted on the upper end of this post is a blow head table 79 containing a cylinder 80 in which a piston 81 is mounted to reciprocate. Arranged on one side of the cylinder 80 is a valve casing 82 which is provided, near each end, with an outlet port (see Fig. 18) one of which has been indicated at 83, while the other has been indicated at 84. The port 84 is in communication, through a passage 85 with the lower end of the cylinder 80 while the port 83 is in communication through a passage 86 with the upper end of the cylinder. A valve 87 is slidably mounted within the casing 82 and has annular grooves 88 and 89 designed, when the valve is shifted in one direction, to establish communication between port 84 and the pressure port 90 and, when shifted in the opposite direction, to establish communication between port 83 and the pressure port 90. The port 90 is connected to a pressure pipe as hereinafter pointed out.

A rod 91 (Fig. 3) extends upwardly from the piston 81 and is provided, at its upper end, with a head 92. This head has a stud 93 extending therefrom on which is journalled a roller 94 adapted to work up and down within a cam slot 95 (Fig. 14) formed within an upstanding guide plate 96 mounted on the table of the blow head. Thus it will be seen that during the upward movement of the piston 81 the cam slot will swing the head laterally after it has moved straight upward a short distance and, during the downward movement of the piston the head 92 will be swung laterally and then moved straight downwardly. Extending from the head 92 is an arm 97 to the outer end of which is attached a cylinder 98. Air under pressure is adapted to be directed under certain conditions to the upper end of the cylinder through a flexible pipe a portion of which has been indicated at 99 and the lower end of the cylinder is provided with an air outlet 100 in which a tubular stem 101 is adapted to slide. This stem is provided at its upper end with an enlargement 102 constituting a valve which rests normally on a seat 103 in the bottom portion of the cylinder 98, and serves to prevent under normal conditions the escape of air downwardly from the cylinder. Radial ports 104 open into the stem below the valve portion thereof so that when the valve is pushed upwardly away from its seat air will be free to escape through the ports 104 and downwardly into the stem.

A disk 105 is carried by the lower end of the stem and constitutes a blow head, this disk being provided at and near its center with outlet ports 106 in communication with the interior of the stem. Thus it will be seen that when the head 92 moves downwardly as hereinbefore described the blow head 105 will come against the upper end of the blank mold at station I and will be shifted relative to the cylinder 98 so that valve 102 will be unseated and the air under pressure within the cylinder will be discharged downwardly onto the gather which may have been deposited in the blank mold at station I. When the head 92 is pushed upwardly it will first move the blow head straight up away from the blank mold and then swing it to one side and on the downward movement of the head 92 this motion will be reversed. Consequently when the blow head is in its normal position it is above but at one side of the blank mold at station I and will not interfere with the placing of a gather downwardly into the blank mold.

Shearing mechanism

Upstanding from the blow head table 79 (Fig. 3) at the inner edge thereof is a pivot pin 107 securing a spring disk holder 108 on which is mounted a ring 109 adapted, when the blank mold is brought to position at station I, to overhang and contact with the upper end of said blank mold. The pin 107 also serves as a pivot for the intermediate portions of crossed levers 110, each lever having one arm sharpened to constitute a shear blade 111 while the other arm of each lever is slotted longitudinally as at 112 (see Fig. 1). The two slotted arms are slidably engaged by studs 113 (Fig. 1) extending from the free ends of a fork 114 provided at one end of a stem 115 projecting from a piston 116. This piston is mounted to slide in a cylinder 117, said cylinder having ports 118 and 119 at the outer and inner ends thereof respectively and which ports communicate with the valve casing 120. Another port 121 (Fig. 18) is arranged at one end of the valve casing 120 and another inlet port 122 is provided at the other end of the casing 120. A pressure inlet port 122' is located between the ends of the casing 120 and exhaust ports 120' are also provided. A valve 123 is slidably mounted in the casing 120 and, when pressure is directed through port 122 against one end of this valve said valve is shifted so as to close communication with port 118 and pressure will be directed from line M to port 119.

The stem 115 of piston 116 slides within a casing 124 and this casing has opposed ports 125 and 126 (see Fig. 18). An annular groove 127 is formed in the stem 115 and when the piston 116 is forced in one direction by the admission of pressure through port 119, this stem 115 will be moved with the piston to bring the groove 127 into register with the two ports 125 and 126, thus to establish communication between the ports.

A spring 128 is mounted on the pivot pin 107 and bears downwardly on the levers 110 so as to bind them together.

As the piston 116 is normally pressed toward the guide plate 96, the two shearing blades are normally held apart. However, when pressure is directed against the inner face of the piston 116 so as to force it in the other direction these blades will be swung toward each other so as to shear the gather suspended therebetween, this shearing action taking place directly over the ring 109.

*Neck pin mechanism*

Carried by the upper portion of the standard 76 is a cylinder 129 in which a piston 130 is mounted to slide. The stem 131 of this piston projects upwardly beyond the top of the standard and is provided, at its upper end, with a head 132 from the top of which extends a tapered plunger or neck pin 133. This neck pin is hollow but closed at its upper end and extending from the base portion of the plunger or neck pin are radial outlets 134 communicating with the interior of said plunger or neck pin. A bore 135 is formed in a stem 131 and has a pressure inlet port 136 while extending from the upper end of the bore is a tubular nozzle 137 extending into the hollow plunger or neck pin but spaced from the walls thereof. Thus it will be seen that air under pressure when directed into the stem 131 will be discharged upwardly against the inner walls of the plunger or neck pin 133 and will then flow downwardly around the nozzle 137 and out through the outlets 134. This acts as a means for cooling the neck portion of the partially completed blank when the gather is packed into the blank mold.

An inlet port 138 is provided in the bottom of cylinder 129 so that when air under pressure is directed therethrough the piston 130 will be raised and the neck pin or plunger elevated into the neck ring 54 at the lower end of the mold at station I.

*Operation at station I*

Pressure is adapted to be directed to the different ports at station I as heretofore indicated and through a system of air conductors which will be hereinafter more fully described. When the blank mold arrives at station I in its inverted and closed position, the gather depending from a punty is lowered into the blank mold. Referring to Fig. 18, during the downward movement of the punty it comes into contact with a lever 139 which, when depressed by the punty, will shift a punty valve 140. This punty valve controls the admission of pressure from a supply to the port 122 of valve 123 and when shifted pressure will be directed to this port. Thus valve 123 will be immediately shifted longitudinally to direct pressure to the port 119 and cylinder 117, and the piston in said cylinder will be shifted outwardly and cause the shearing blades to be quickly drawn together to sever the supported gather. Immediately subsequent to this severing action the groove 127 establishes communication between the pressure supply through the ports 125 and 126 and causes the pressure to be distributed to one end of the valve casing 82 and to the port 121. The pressure directed into port 121 will restore the valve 123 to its initial position and will direct pressure through port 118 against the outer face of the piston 116 so that said piston and its stem 115 will be shifted inwardly to their first positions. The pressure directed into the end of the valve casing 82 will shift the valve 87 out of its normal position so as to direct pressure through the valve casing by way of groove 88 into the upper end of the cylinder 80, thus to force the piston 81 downwardly. Obviously the shearing action will be almost instantaneous and will take place before the blow head can be lowered. As the blow head is lowered by the downward movement of piston 81 the various parts will operate as hereinafter pointed out, the disk 105 coming against the ring 109 so that pressure will be promptly directed downwardly on to the gather. This gather will be packed about the neck pin or plunger 133 which, previously has been elevated into the neck ring at the lower end of the mold. It is of course to be understood that the blank mold is so positioned on the blank table that it will be supported in proper position to receive the neck pin or plunger and to be engaged by the blow head at station I.

The cylinder 129 has an inlet port 141 and this port as well as the port 138 are in communication with certain pressure conductors as will be hereinafter described so that the neck pin or plunger will be withdrawn from the neck ring at station I immediately after the packing of the gather about said neck pin or plunger and just prior to the movement of the blank mold from station I to station II.

*Blank blowing mechanism*

Figure 4:
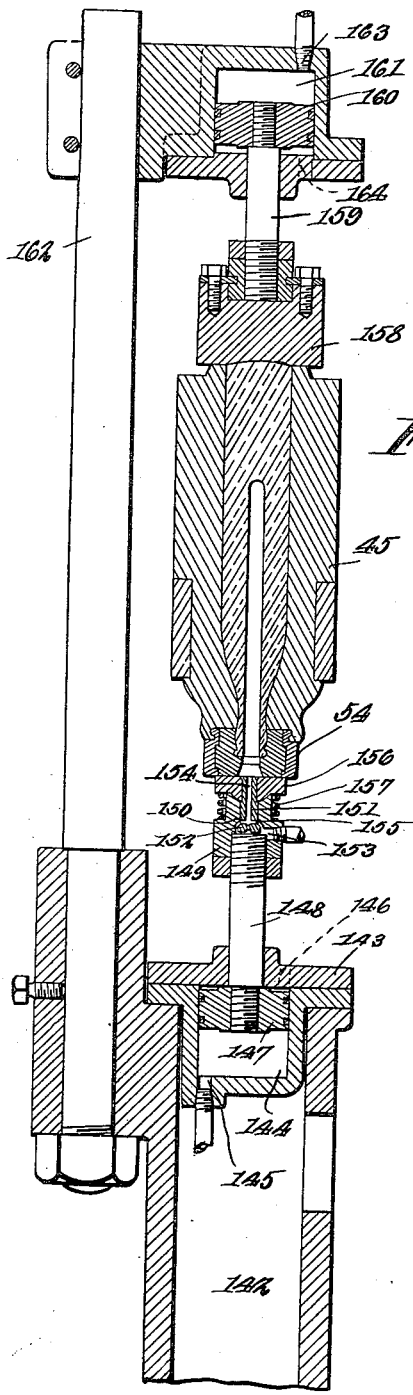
Fig. 4 is a section on line 4—4 of Fig. 1.

The blank blowing mechanism may be at station II on a standard 142 (see Fig. 4) supporting a table 143 to which is connected a cylinder 144, this cylinder being provided with a port 145 at the bottom thereof and another port 146 at the top thereof. A piston 147 is mounted to slide within the cylinder and has a stem 148 projecting upwardly therefrom and carrying a blow head 149 having a central bore 150. Slidably mounted within this bore is a stem 151 extending from a valve 152 and this valve is adapted normally to press against a seat at the lower end of the bore 150. A port 153 is designed to direct pressure into the blow head and below the valve 152. The stem 151 of the valve has a passage 154 extending from the upper end thereof to a point close to the valve 152 and radical ports 155 are formed in this stem 151 close to the valve. When the valve is seated by the pressure of air thereagainst from port 153 the ports 155 will be closed. Disk 156 is connected to the upper end of the valve stem 151 and a spring 157 serves to hold this disk normally elevated and the valve 152 normally on its seat. However, when the blow head is elevated so that the disk 156 will come against the neck rings of the blank mold at station II, the blow head 149 will move upwardly against the disk 156 and cause the valve 152 to be unseated so that pressure will thus pass from the port 153 through the radial ports 155 and the passage 154 and thence into the recess in the blank which had been formed at station I by the neck pin or plunger. Consequently the gather will be initially blown.

For the purpose of finishing the upper end of the blank at station II and also limiting the upward movement of the blown gather, a baffle disk 158 (Fig. 4) is connected to the lower end of the stem 159 and a piston 160. This piston is mounted to slide within a cylinder 161 attached to the upper end of a post 162, which post is adjustably connected to the standard 142. The cylinder 161 has a port 163 at its upper end and another port 164 at its lower end, and when pressure is directed into the lower port the baffle disk will be raised. While pressure is directed into the upper port the baffle disk will be lowered as will be obvious. The two pistons 147 and 160 are adapted to be operated simultaneously by means of pressure in the air system to be hereinafter described, as soon as the blank mold stops at station II.

Blow table

The blow table 5, (Figs. 1a and 2a) which is mounted for rotation on a stand or pedestal 4 is spaced from the blank table 3 and is provided at its periphery with a series of mold bottoms 165 equal in number to the number of blow molds assembled with the table. In the present instance six blow molds have been illustrated, but it is to be understood that this number may be increased or reduced if desired. The two tables are adapted to rotate in unison by means of mechanism hereinafter more fully described so that each time a blank is brought to position at station III and while said blank is being suspended solely by the neck rings of the blank mold, a mold bottom 165 is brought to position under the supported blank and an open blow mold is brought to position to grip the suspended blank, this gripping action taking place immediately prior to the release of the blank from the neck ring members of the blank mold. In order that this operation may take place it is necessary that the members of the blank mold members and the members of the blow mold be coupled to occupy positions concentric with a common center, during the transfer of the blank from one table to the other.

The blow molds, where six of them are used, are adapted successively to assume every one of six stations indicated respectively at I', II', III', IV', V', VI'. Station I' is located at the point of transfer and the other stations are disposed successively in counter-clockwise arrangement about the table 5. As all of the blow molds are of the same construction, it is deemed necessary to describe only one of them in detail, it being understood that each blow mold passes successively to all of the stations of the blow table and returns to station I' after it has completed one cycle.

Referring to Figs. 1a and 2a one of the mold bottoms 165, as before stated, is provided for each blow mold, these bottoms being adapted to assume positions successively under the blanks successively brought to the point of transfer. Mounted on the table 5 at regular intervals are brackets 166 each of which has pivotally connected to the outer end portion thereof arms 167 extending from the respective members 168 of the blow mold. Guide rods 169 are carried by the bracket and slidably mounted on these rods is a cross head 170 having a centering recess 171 adapted, when the cross head is in its outermost position relative to the bracket to receive a centering lug 172 extending inwardly from the bracket. The cross head has a roller 173 on its upper face and slidably mounted in the sides of the cross head are links 174 the outer ends of which are pivotally attached to the respective arms 167. Springs 175 are mounted on these links and are adapted when the cross head is pressed outwardly to thrust against the links and press the members of the blow mold together. A push cam 176 is fixedly mounted above a table and extends from station I' to station IV' and when the blow mold is passing from station I' to station IV' the roller 173 will travel along the periphery of this push cam so as to hold the members of the blow mold closed together tightly.

Fixedly mounted above the blow table so as to extend from stations IV' to I' is a pull cam 177 designed to receive the roller 173 as it leaves station IV' and gradually pull said roller inwardly as it passes to the next two stations V' and VI', this pulling action serving to pull the members of the blow mold gradually to open positions until, when the blow mold reaches and passes station VI' the members of the blow mold are drawn back close to the periphery of the blow table so that they can move readily into position at station I' without coming into contact with the blank mold and the blank which have been brought to station III of the blank table. As soon as the blow mold reaches station I' the roller 173 will pass off of the end of pull cam 177 and into the path of setting mechanism provided therefor.

Setting mechanism

Mounted on the stand or pedestal 4 and above the blow table is a cylinder 178 (Figs. 1a and 2a) having end ports 179 and 180 and slidably mounted in this cylinder is a piston 181 the stem 182 of which is adapted to work along a radial line extending to station I'. This stem is provided at its free end with a tapered button 183, and when the roller 173 passes off of the end of pull cam 177 at station I' it arrives in position in the path of this button so that when pressure is at this time directed from port 180 against the piston 181 the button 183 will be pressed outwardly against the roller and cause the cross head 170 to slide outwardly along its guide rods 169 and until it comes against the outer portion of the bracket 166. This action will cause the members of the blow mold to swing together, under the neck ring sections of the blank mold and about that portion of the blank which has been released from engagement with the members of the blank mold. This outward movement of the cross head 170 also brings the roller 173 into position where it can pass into engagement with the periphery of the push cam 176 when the blow mold begins to leave its station I'.

Finishing apparatus

The blow mold when it leaves station I' carries the blank to station II' where it is held firmly in the blow mold and then passes to station III'. At station III' the blowing of the blank is completed by the use of a special blow head provided for that purpose. Referring to Figs. 1a and 5, a standard 184 is mounted on the base 1 at station III' and supports a table 185 to which a post 186 is secured. Adjustably mounted on this post is a cylinder 187 having ports 188 and 189 in the top and bottom thereof respectively and which are adapted to receive pressure as hereinafter pointed out. A piston 190 is slidably mounted in the cylinder and has a stem 191 projecting downwardly therefrom and connected, at its lower end, to a blow head 192. This blow head has a pressure port 193 opening thereinto and below the pressure port is a bore in which is slidably mounted the stem 194 of a valve 195. This stem has a passage extending thereinto from its lower end and radiating from the upper end of the passage are ports 196 located under the valve so that when the valve is seated communication will be closed between these ports and the pressure port 193. A disk 197 is slidably mounted in the lower portion of the blow head and moves with the stem of the valve, there being a nozzle 198 projecting downwardly from the center of the disk, the passage in the valve stem extending through the nozzle. A washer 199 preferably of asbestos is seated on the bottom face of the disk 197 and extends around the nozzle 198. It will be apparent that when pressure is directed on to the upper face of the piston 190, the blow head will be lowered so that the washer 199 will come against the mouth of the blank held in the mold at station III' and the nozzle 198 will project into the blank. The pressure of the washer on the blank will cause the valve 195 to be unseated so that pressure will pass from port 193 through the passage in the valve stem and through the nozzle into the blank. Leakage of air from the blank is prevented by the washer 199. When pressure is directed against the bottom of the piston 190 said piston will be raised and the blow head removed from the blank so that valve 195 will close automatically.

In order that the blow mold shall be securely held together in the blowing operation, a clamping mechanism is provided at station III'. This mechanism includes opposed jaws 200 which are pivotally mounted on the posts 186 and are normally spread apart. Links 201 are connected to the rear ends of the jaws back of the pivotal connections with the post and these links are in turn pivoted to the stem 202 of a piston 203. This piston is slidably mounted in a cylinder 204 mounted on the table 185 and the said cylinder is provided at its ends with ports 205 and 206 respectively. Thus when the blow mold arrives at station III' pressure will be instantly directed, as hereinafter described through port 205, thereby forcing the piston 203 inwardly so that the stem of the piston will push through the toggle links 201 against the rear ends of the jaws 200 and cause the other ends of the jaws to swing towards each other. Thus the jaws will receive between them a clamp upon the free longitudinal edge portions of the members of the blow mold and will hold said members securely together so that they will not push apart when subjected to internal pressure. Immediately after the completion of the blowing operation the piston 203 will be moved outwardly and the clamping jaws disengaged from the blow mold, this action taking place just prior to the movement of the blow mold away from station III'.

*Delivery mechanism*

The delivery of the finished articles may advantageously take place at station V' in which case the station IV' is an idle station, permitting the article to partly cool in the blow mold. Delivery of the article may be facilitated by the provision of a suitable takeout mechanism of any approved type, such takeout mechanism not forming any part of the present invention. As illustrated herein, however, the takeout mechanism may include a valve casing 208 (see Fig. 18) at station V', which casing has a pressure inlet 209 and spaced outlet ports 210 and 211. End ports 212 and 213 are provided in the casing and a valve 214 having a spaced annular groove 215 is slidably mounted therein. A cylinder 216 is located above the casing and slidably mounted therein is a piston 217 having a stem 218 which projects beyond the outer end of the casing 216. A passage 219 extends longitudinally through the stem 218 and also through the piston and mounted on the outer end of the stem is a cylinder 220 having a port 221 which communicates constantly with the passage 219. Slidably mounted in the cylinder 220 is a piston 222 having an annular groove which normally maintains communication between the port 221 and an outlet port 224. Another port 225 is provided at the bottom of the cylinder 220. The stem 226 of the piston extends downwardly beyond the cylinder 220, and carries a pair of ware-gripping members of suitable construction.

As the blow mold with the finished bottle in it stops at station V', air from line H (Fig. 18) shifts valve 214 to the left, permitting the flow of air from line M through line N to the underside of piston 222, raising the piston in its cylinder 220. This lifting movement causes the gripping members to grip and lift the ware off the blow mold bottom plate 165. At the end of the upward movement of the piston 222, the passage 219 is uncovered, admitting air from line N through cylinder 220 to the rear end of cylinder 216, forcing the piston 217 therein outwardly to move the ware-gripping members and bottle laterally away from the mold. At the end of said outward travel, the cylinder 220 strikes valve stem 241 in casing 240, shifting said valve to admit air from line M to line K to reverse valves 214, thus reversing the movement of the takeout to lower the piston 222 and its gripping head to deposit the bottle on a conveyor 245 (see Fig. 1a), which may be intermittently operated by means of a piston 253 (Fig. 18) working in a cylinder supplied with air by lines O and P connected respectively to ports 326 and 325 of the table turning control valve 318.

*Blow table controlling valves*

Fixedly mounted above the button 183 is a valve casing 258 (see Fig. 2a) and slidably mounted in this casing is a poppet valve 259 (see Fig. 18) the stem of which projects downwardly into the path of the tapered button 183. This valve casing has a pressure port 261 and an outlet port 260, the two ports being normally out of communication. However, when the button is thrust outwardly so as to cause the blow mold to engage a blank delivered to station I' the button will lift the poppet valve and establish communication between the pressure port and the outlet port.

Figure 17:
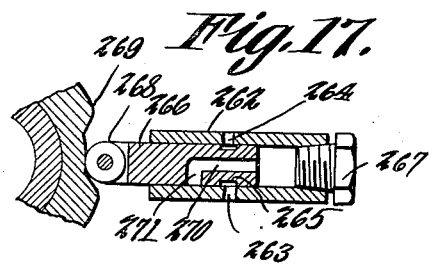

Connected to the stand or pedestal 4 below the blow table at station I' is a valve casing 262 (Fig. 2a) this casing having opposed ports 263 and 264 (Fig. 18) which normally communicate through an annular groove 265 formed in a valve 266. A pressure port 267 is provided at one end of the valve casing. The valve projects from the other end of this casing and carries a roller 268 which is adapted to be successively engaged by a series of cams 269 (see Fig. 17) on the hub portion of the blow table, one of these cams being provided for each blow mold. A longitudinal bore 2170 extends into the valve 266 and has a radial port 271. Each time one of the cams 269 comes against the roller 268, the valve 266 will be pressed outwardly, thereby closing communication between the opposed ports 264 and bringing the port 271 in communication with one of the opposed ports so that pressure will be directed thereto from the port 267 for the purpose hereinafter pointed out.

Mounted adjacent the cylinder 178 is a valve casing 272 (Figs. 2a and 18) having end ports 273 and 274, a central pressure port 275, space outlet ports 276 and 277 and exhaust ports 278 and 279. The outlet ports 276 and 277 are in communication with the end ports 179 and 180 respectively of the cylinder 178. A valve 280 is slidably mounted in the casing 272 and is provided with spaced reduced portions extending annularly therein. These reduced portions are so proportioned that when the valve 280 is shifted to the left the port 277 is placed in communication with the exhaust port 279 while the pressure port 275 is placed in communication with the outlet port 276. When pressure is directed against the other end of the valve it will be shifted so as to reverse the direction of pressure past the valve and into the cylinder 178.

Operating mechanism

The driving mechanism for the tables 3 and 5 may include a gear 281 formed on or secured to the periphery thereof, the two gears being indicated at 281 (Figs. 2 and 2a). Both gears constantly mesh with an intermediate gear 282 (Figs. 1 and 1a) arranged between the two tables at stations III and I'. The gear 282 (Figs. 2 and 2a) is keyed or otherwise secured to the upper end of a shaft 283 which is journaled at its lower end in a bearing 284 on the base 1. The lower portion of the shaft is arranged in a housing 285 on the base and mounted to reciprocate within this housing is a rack bar 286 the free end of which is beveled at the top as shown at 287 (see Fig. 18).

A gear 288 is feathered on the shaft 283 and is coupled as at 289 to a sleeve 290 mounted to slide on the upper portion of the shaft and guided within the housing 285.

The upper portion of the housing is formed with a cylinder 291 in which a piston 292 is adapted to reciprocate. This cylinder has a port 293 at its upper end and another port 294 at its lower end. These two ports are connected to the pressure system as hereinafter pointed out.

Connected to the upper end of the sleeve 290 is a cross head 295 designed to move upwardly and downwardly with the sleeve when actuated by the piston and attached to the outer ends of this cross head are combined bolts and valves 296 and 297 which are slidably mounted within bores 298 and 299 respectively in outstanding arms 300 which constitute bearings for the gear 282. These outstanding arms are connected to the housing 285 by means of standards 301. The combined bolt and valve 296 has an annular groove 302 and a similar groove 303 is formed in the combined bolt and valve 297. Opposed ports 304 are formed in the outstanding arm at opposite portions of the bore 298 and opposed ports 305 open into the bore 299. Thus when the combined bolts and valves are moved upwardly and downwardly they will momentarily establish communication between the ports 304 and between the ports 305 respectively. When the bolts are moved upwardly, which action takes place as soon as the two tables come to a stop, they will enter openings formed in the peripheral portions of the tables so as to lock the tables against movement. These openings are so located that each time one of the blank molds is brought to station III and one of the blow molds is brought to station I' certain of the openings will be in position to receive, and will receive the bolts.

The rack bar 286 is connected to or formed with the stem 307 of a piston 308 (see Figs. 1 and 18). This piston is designed to reciprocate within a cylinder 309 mounted on the base 1 between the stations II and I'. Back of the cylinder is arranged a supplemental valve casing 310 (Fig. 18) having a pressure port 311 at its back end while at the side of this supplemental valve casing are provided spaced outlet ports 312 and 313 and an exhaust port 314. A valve 315 is slidably mounted in the supplemental casing 310 and has an annular groove 316 in communication with a longitudinal bore extending into the valve from the pressure end thereof. A stem 317 projects from the valve and into the cylinder 309 so that when the piston 308 is moved backward it will strike the stem and shift the valve 315 to establish pressure between the ports 311 and 312 and to open the exhaust 314. Under normal conditions communication is established between the port 311, groove 316 and port 313.

Arranged adjacent the cylinder 309 is a valve casing 318 having an intermediate pressure port 319, end ports 320 and 321 and spaced outlet ports 322 and 323. A valve 324 is mounted for reciprocation in this casing and has spaced reduced portions so that when pressure is directed from port 320 against the valve the pressure port 319 will be placed in communication without outlet port 322, and when the valve is shifted in the opposite direction pressure will be directed from port 319 to 323. The port 322 is in communication with a back port 325 in the cylinder 309 while the port 323 is in communication with a front port 326 in said cylinder 309.

The beveled end 287 of the rack bar is adapted, when said rack bar is shifted forwardly by the piston 308 to move under and lift a poppet valve 326', thus to establish communication between a pressure port 327 and an outlet port 328 in the casing 329 of the valve.

Mounted on the base 1 between stations I and II is the casing 329' of a controlling valve 330. This casing has end ports 331 and 332, and intermediate pressure port 333 and spaced outlet ports 334 and 335. Thus when pressure is directed against one end of the valve 330 from port 332 the pressure port 333 will be placed in communication with outlet port 335 and, when the motion of the valve is reversed the pressure port 333 will be placed in communication with outlet port 334.

Pressure system

The various pistons, valves, blow heads, etc., are adapted to be supplied with air under pressure from a pressure supply pipe M. By referring to the diagram (Fig. 18) it will be seen that this pressure line M extends to one of the ports of the punty valve 140, to the port 90 of the valve casing 82, to the plunger 132, to port 125 of casing 124, to inlet to valve casing 120, to port 25 in casing 21, to port 65 in casing 64, to port 327 in casing 329, to the port 333 in valve casing 329', to port 319 in valve casing 318, and to port 311 in valve casing 310. The main supply line then extends to certain of the apparatus on and adjacent the blow table and communicates with the port 267 in casing 262, with port 261 in valve casing 258, with port 275 in valve casing 272, with the blow head 192, with the port 239 in valve casing 238 and with port 209 in valve casing 208. This pressure is constant in the various valve casings mentioned and where it comes against the end of a valve it holds said valve normally unseated from the outlet port as shown, for example, at casing 21, casing 310, casing 262, and casing 238. Constant pressure is maintained in the plunger 132 and blow head 192, but, obviously, is not released therefrom until this blow head is shifted out of its normal position as has hereinbefore been described.

In addition to the pressure line M there are various other pressure lines which are designed during certain stages of the operation to direct pressure against certain parts of the apparatus from the pressure line M, thereby to produce the various operations in accurately timed succession.

A line A connects the upper end of the cylinder 220 with the port 210 in valve casing 208.

Line N connects the port 225 in the bottom of cylinder 220 with the port 211 in casing 208.

Another line K connects the port 240' in casing 238 with the port 212 in casing 208.

A line H extends from the port 205 in cylinder 204, and from port 188 in cylinder 187, to the port 294 of cylinder 291, to the port 138 of cylinder 129, to the port 145 of the cylinder 144, to port 163 of cylinder 161, to port 335 of valve casing 329' and to one of the ports 305 of bolt valve 297.

Another line H' extends from the other port 305 to port 213 in casing 208.

Another supplemental pressure line P extends from the port 256 in cylinder 254 and thence to port 325 in cylinder 309 and to port 322 in valve casing 318.

A line F communicates with the port 189 in cylinder 187 and with the port 206 in cylinder 204, and this line extends to the blank table and communicates with the port 164 in cylinder 161, with port 146 in cylinder 144, with the port in the top of cylinder 129, with the port 293 in cylinder 291, with the ports 304 intersected by the bolt valve 296, with the port 320 in the valve casing 318, and with the port 334 in the valve casing 329'.

Another supplemental pressure line has been indicated at O, this line opening into the port 255 in cylinder 254, in port 326 in cylinder 309, and in port 323 in valve casing 318.

Another supplemental pressure line has been indicated at L, this line opening into port 273 of valve casing 272, port 263 in valve casing 262, port 75 in valve casing 64, and to a port in the outer end of cylinder 216.

Another supplemental pressure line has been indicated at J, and extends from the port 260 in valve casing 258 to port 74 in valve casing 64.

A supplemental line I maintains communication between port 274 in casing 272 and port 27 in casing 21.

A supplemental pressure line C leads from the port 121 of valve casing 120 and communicates with the port 126 in valve casing 124 with one of the end ports in valve casing 82, and with the port 321 in valve casing 318.

A short supplemental pressure line B connects the punty valve 140 with the port 122 in valve casing 120.

A supplemental pressure line D opens in the blow head 98, the blow head 148 and the port 313 of valve casing 310. Another line E extends from the port 312 in valve casing 310 and opens into the port 331 in valve casing 329' and into the other end port in the valve casing 82.

An additional supplemental pressure line has been indicated at G and extends from the port 328 in valve casing 329 to the port 332 in valve casing 329'.

*General operation*

The operation of the various units of the illustrated apparatus has already been described, but in addition thereto the general operation of the machine might be described as follows:

With all parts in normal position, a charge of molten glass is deposited in the blank mold at station I and the punty valve is depressed by the gatherer if the machine is fed by hand which allows air, under pressure, to pass from line M to line B which leads to the end of the valve casing 120. This moves the valve therein to position to admit air to the front of piston 116 of cylinder 117, which action closes the shear blades as already described. When piston 116 reaches the end of its backward stroke groove 127 of stem 115 is brought into register with port 125 of the casing 124. This passes air from supply line M to outlet line C leading to end of valve casing 120 and causes this valve to move to position to pass air to the rear of piston 116 in cylinder 117, which then opens the shear blades.

If the feeding is accomplished automatically, the shears and punty trip are unnecessary, and the cycle of operations is started by admitting air to line C by means controlled by the feeding device. Line C leads to end of valve casing 82 which moves the valve therein to position to admit air to the top of piston 81 in cylinder 80. This causes the piston to move downward, carrying head 92 downward, causing the blow head to swing directly over and down on to the blank mold as already described.

Line C also leads to the end of valve casing 318 causing the valve therein to move to position to admit air to the front of piston to move it backward within cylinder 309. The backward motion of piston 308 can be controlled by throttling the exhaust therefrom. This backward stroke of piston 308 is employed as a timing means and regulates the length of time air under pressure is permitted to remain on the glass within the blank mold at station I. This timing is accomplished in the following manner:

In normal position, constant air under pressure at the rear of valve casing 310 holds valve 315 forward so that its stem projects into cylinder 309 as shown in Fig. 18. With valve 315 in this position, air passes out of port 313 and through line D to blow heads 148 and 98, which, however, do not blow until pressed tightly against their respective molds. When piston 308 on its backward stroke, reaches projecting stem of valve 315, this valve is caused to move backward, which action closes port 313 and cuts off air to line D thereby cutting off air supply to blow heads 148 and 98 and placing this line in exhaust from port 314. The further backward motion of valve 315 brings air to register with outlet port 312 supplying line E with air which line E leads to end of valve casing 82 causing the valve therein to move to position admitting air through ports 90 and 84, to the bottom of piston 81 of cylinder 80. This causes this piston to move upward and raise blow head 98 which swings upward and back to normal position.

Line E also leads to end of valve casing 329", moving the valve therein to position admitting air from supply line M to outlet line F which line F admits air to top of piston 130 of cylinder 129, causing this piston to descend and withdraw the neck pin or plunger from the molten glass in the blank mold at station I.

Line F supplies air to top of piston 147 of cylinder 144 which causes this piston 147 to move downward, withdrawing blow head 148 away from the blank mold at station II. This line F also supplies air to the under side of piston 160 of cylinder 161, causing piston 160 to move upward and raise the baffle plate 158 free of the mold at station II.

The line F likewise supplies air to the under side of piston 190 in cylinder 187, causing the piston to raise the blow mold blow head 192 free of the mold and finished mouth at station III'. The same line, F, supplies air to the front of piston 203 of cylinder 204, causing the piston to move backward and open the clamping jaws 200 and release the blow mold at station III'. Air is supplied to the top of piston 292 of cylinder 291 by line F, causing piston 292 to move downward which action shifts the gear 288 into mesh with rack 286 and causes the bolt valves 296 and 297 to pull out of the holes provided therefor in the tables. Both tables are then ready to be advanced one step or station. It will be noted that all pistons operated by action of air through line F are moved simultaneously except the downward motion of piston 292 in cylinder 291, which action is preferably controlled or delayed by throttling the exhaust from beneath this piston. With register pin 296 in lowered position, groove 302 is in register with ports 304 and air from line F is permitted to pass to the end of valve casing 318, which causes the valve therein to move so as to admit air to the rear of piston 308 of cylinder 309, which moves piston 308 forward. The forward movement of said piston carries forward the rack 286 which is in mesh with the shiftable gear 288.

During the movement of the tables the roller 268 on the outer portion of valve 266 in casing 262 comes in contact with cam 269 on the hub of the blow mold table 5, which causes valve 266 to move backward bringing port 271 into register with outlet port 263, and allowing air to pass from supply line M to the line L which leads from port 263 to the end of valve casing 272. The valve 280 is thus moved to position to admit air to the front of piston 181 in cylinder 178 and cause the tapered push button 183 to return to normal position. This permits the poppet valve 259 in casing 258 to close and cut off air from supply line M to line J.

Line L leads to the end of valve casing 64 so as to move the valve therein to position to admit air from supply line M to the rear of piston 61 of cylinder 60 which causes spool 63 to move to forward position. Line L leads to front of piston 217 of cylinder 216 causing piston 217 to move back within its cylinder and move the taking out mechanism back. This is permitted by exhausting through passage 219 in piston rod 218, which exhaust passes around grooved portion of piston 222 and escapes to the atmosphere by way of vent 224 in the side of cylinder 220. The returning of piston 217 of cylinder 216 and the backward movement of cylinder 220 permits air in the rear of valve 241 in casing 238 to force said valve 241 forward. This cuts off register of groove 240 of the valve with outlet port 240', thereby cutting off the air supply of line K.

When the blank mold containing the charge of glass has been moved from first or filling station I to station II, the turning rack 286 and piston 308 have reached the end of their forward stroke. This brings the beveled end of the rack in contact with the projection of the valve 326' in casing 329, which lifts the valve so as to admit air from supply line M to outlet line G which leads to one end of valve casing 329' and moves the valve therein so as to supply air from supply line M to outlet line H. Line H operates to raise piston 130 of cylinder 129 which moves the neck pin or plunger 133 upward within the neck ring of the blank mold at station I, which mold is then prepared to receive another charge of molten glass.

Line H operates to raise piston 147 in cylinder 144 to position the blow head 148 tightly against the neck ring of the blank mold at station II. This line H also acts to lower piston 160 of cylinder 161 which action carries baffle plate 158 downward and tightly holds the same upon the top of the blank mold at station II. The upward movement of blow head 148 which is now tightly pressed against the neck ring opens the valve therein as hereinbefore described. Line H also directs air against piston 203 which closes the clamping jaws 200, as described. The same line 15 also directs air to piston 190 in cylinder 187 which action lowers blow head 192 at station III' and brings asbestos washer 199 to sealing position and completes the blowing operation as before pointed out. Air is directed from line H against piston 292 (see Fig. 18) which shifts the gear 288 upward and out of mesh with rack 286 and also acts to raise the bolt valves 296 and 297 and lock the tables. The upward movement of valve bolt 297 causes groove 303 to pass outlet port 305 thereby allowing air to pass from the said line H to end of valve casing 208 (see Fig. 18) which moves the valve therein to position allowing air to pass from supply line M to outlet line N leading to under side of piston 222, thereby moving the piston upward in cylinder 220. The air thus entering the cylinder 220 also and at the same time operates the plunger 234 and the gripping forks as already described.

At the point where piston 222 has passed and uncovered port 221 which extends through the wall of cylinder 220, air passes through piston rod 218 and is admitted to rear of piston 217 in cylinder 216 causing said piston to move forward in its cylinder 216. Air will exhaust through line L to groove 265 in valve 266. When the taking out mechanism has carried the glass article to the position directly over the conveyor, as heretofore described, the cylinder 220 comes in contact with the projecting stem of valve 241 which registers groove 240 with the outlet port 240' of valve casing 238, and permits air to pass from supply line M to outlet line K (see Fig. 18) leading to valve casing 208. This moves the valve therein to position to admit air from supply line M to outlet line A which operates to move piston 222 downward in cylinder 220, which action lowers the glass article to the conveyor and opens the gripping jaws. At this stage of operation the delivering mechanism remains at rest.

The air time on piston 253 of the conveyor mechanism is the same as the air time on piston 308 of cylinder 309. Therefore when air enters cylinder 309 at the rear of piston 308 to cause the tables to turn, air also enters cylinder 254 through line P at the rear of piston 253, causing the conveyor to move forward. Likewise, when air enters cylinder 309 at the front of piston 308 causing this piston to move back, air also enters cylinder 254 through line O in front of piston 253, causing this piston to move back. Thus it will be seen that when an article is deposited upon the conveyor by the taking out mechanism, the action of the conveyor moving forward carries the extended neck portion of the article out of the path of the delivery mechanism.

The successive operations produced by the rotation of the blank table relative to its stand or pedestal have already been described, air under pressure being supplied constantly to the various pressure passages in the stand or pedestal. The series of blank molds are so disposed relative to each other that when a blank mold is moved from station II to station III, a blow mold is moved from station VI' to I'. Each time one movement is imparted to the blank table, a corresponding movement is imparted to the blow table, because the two tables receive motion from the same interposed gear.

It might be stated in further explanation of the operation of the machine that immediately preceding the arrival of the blank mold at station III, the plunger 39 is caused to move in cylinder 33 by coming in contact with the cam extending from the side of the valve casing 21. This insures the plunger 39 passing into position directly in front of the valves 22 so that when piston 49 moves back in cylinder 33 piston 49 will come into contact with the plunger 39 and force said plunger to move the valve back in casing 21, thereby allowing air to pass from supply line M to outlet line I. This line I leads to the end of valve casing 272 so that when air is directed against the valve 280 from line I said valve will be shifted so that air will be supplied from line M to the rear of piston 181 in cylinder 178. The forward movement of this piston carries forward the button 183 which comes in contact with the roller 173 and causes the blow mold at station I' to close around the glass blank which, as before described, is held suspended at this position from the neck ring located at station III. Just before the blow mold has closed tightly around the glass blank the button 183 raises the valve 259 so that air is permitted to pass from the line M to the line J which leads to the end of the valve casing 64. Therefore the valve 72 in said casing will be moved so as to allow air to pass from the line M to the front of piston 61 in cylinder 60, causing this piston to move back and carry the spool 63 which operates to open the jaws of the neck ring, thereby releasing the glass blank.

It will be seen from the foregoing that the entire operation of the machine is automatic, the control being effected by the actuation of the punty valve in the machine illustrated.

The apparatus may be mounted on wheels 336 so as to be conveniently moved from place to place.

What I claim as my invention and desire to secure by Letters Patent is:

1. Glassware forming mechanism comprising a first rotatable carrier, radially disposed guide way means mounted thereon, a bearing permitting movement of the guide way means as to the carrier, a sectional first mold mounted on the radially remote portion of the guide way means and having means reciprocable in the guide way means in addition to the movement of the guide way means as to the bearing for opening the mold, power actuating means for said reciprocating means, a second carrier eccentric of and rotatable relatively to the first carrier, a second mold on the second carrier for receiving glass from the opening first mold on the first carrier, said second carrier mold being movable with the second carrier to approach said opening mold on the first carrier, driving means for rotating said carriers in synchronism to bring said molds simultaneously toward each other, and means for transferring ware directly from the first carrier mold to the second carrier mold.

2. Glassware apparatus comprising a first rotatable carrier, provided with a radially disposed bearing, guide way means rotatably mounted in said bearing, a sectional blank mold carried by the guide way means radially beyond the bearing and having means reciprocable in the guide way means in addition to the movement of the guide way means as to the bearing for opening the mold, power actuating means for said reciprocating means, a second relatively rotatable carrier having a blow mold movable with the second carrier to approach said open blank mold on the first carrier, divided neck rings associated with said sectional blank mold, and means for operating said neck rings automatically for transferring ware directly from the blank mold to the blow mold.

3. Glassware forming apparatus comprising a first rotatable carrier provided with a bearing, guide means rotatably mounted in said bearing, a mold carried by the outer portion of the guide means radially beyond the bearing and having means reciprocable in the guide means in addition to the movement of the guide means as to the bearing for opening the mold, an actuator for said reciprocating means, driving means coacting to give the carrier determined travel, stationary means coacting in a limited region of carrier travel for there rotating the guide means, and a second relatively rotatable carrier having a mold movable therewith to approach said open mold on the first carrier, and pneumatically operated means for transferring the ware directly from the open mold of the first carrier to the mold of the second carrier.

4. Glassware forming apparatus comprising a first rotatable carrier provided with a bearing, guide means rotatably mounted in said bearing, a mold carried by the outer portion of the guide means radially beyond the bearing and having actuating means reciprocable in the guide means in addition to the movement of the guide means as to the bearing for opening the mold driving means coacting to give the carrier a partial rotation, stationary means extending to be engaged by the guide means for rotating the guide means in the bearing, a holding device coacting to hold the guide means from rotation when away from the stationary means, a second relatively rotatable carrier having a mold therewith to approach said open mold on the first carrier, and pneumatically operated means for transferring the ware directly from the open mold of the first carrier to the mold of the second carrier.

5. A glassware forming machine comprising two circularly movable mold carriers and driving means for rotating them in synchronism, a plurality of molds mounted on each of said carriers, the molds on one of said carriers being adapted to receive charges of glass and shape them for finishing in the molds on the other carrier, rotatable bearing members for said shaping molds on the first named carrier having their axes radially disposed with reference to its axis of rotation and revolving in a circular path around it, bearings for said members on said carrier permitting independent rotation thereof, guides radially disposed within said bearing members, means reciprocable in said guides for opening and closing said shaping molds, an actuator for said means, a transfer point at which the paths of movement of said carriers converge, and power means operable at said transfer point for effecting transfer of the ware directly from one mold to the other.

6. Glass blowing apparatus comprising laterally adjacent relatively eccentric first and second rotatable carriers, driving means effecting partial similar direction of rotation of the carriers, a stationary segment having its toothed portion extending downward toward the first carrier, guide means rotatably mounted on the first carrier and provided with a gear disposed to come into engagement with the segment, a mold carried by the outer portion of the guide means radially beyond the gear, reciprocable actuating means axially disposed in said guide means and pneumatically operated means for moving said actuating means for opening the mold.

7. Glassware forming mechanism comprising a first rotatable carrier, radially disposed guide way means mounted thereon, a bearing permitting movement of the guide way means as to the carrier, a sectional first mold mounted on the radially remote portion of the guide way means and having means reciprocable in the guide way means in addition to the movement of the guide way means as to the bearing for opening the mold, power actuating means for said reciprocating means, a second carrier eccentric of and rotatable relatively to the first carrier, a second mold on the second carrier for receiving glass from the opening first mold on the first carrier, said second carrier mold being movable with the second carrier to approach said opening mold on the first carrier and driving means for rotating said carriers in synchronism to bring said molds simultaneously toward each other.

8. Glassware apparatus comprising a first rotatable carrier, provided with a radially disposed bearing, guide way means rotatably mounted in said bearing, a sectional blank mold carried by the guide way means radially beyond the bearing and having means reciprocable in the guide way means in addition to the movement of the guide way means as to the bearing for opening the mold, power actuating means for said reciprocating means and a second relatively rotatable carrier having a blow mold movable with the second carrier to approach said open blank mold on the first carrier.

9. Glassware forming apparatus comprising a first rotatable carrier provided with a bearing, guide means rotatably mounted in said bearing, a mold carried by the outer portion of the guide means radially beyond the bearing and having means reciprocable in the guide means in addition to the movement of the guide means as to the bearing for opening the mold, an actuator for said reciprocating means, driving means coacting to give the carrier determined travel, stationary means coacting in a limited region of carrier travel for there rotating the guide means, and a second relatively rotatable carrier having a mold movable therewith to approach said open mold on the first carrier.

10. Glassware forming apparatus comprising a first rotatable carrier provided with a bearing, guide means rotatably mounted in said bearing, a mold carried by the outer portion of the guide means radially beyond the bearing and having actuating means reciprocable in the guide means in addition to the movement of the guide means as to the bearing for opening the mold driving means coacting to give the carrier a partial rotation, stationary means extending to be engaged by the guide means for rotating the guide means in the bearing, a holding device coacting to hold the guide means from rotation when away from the stationary means, and a second relatively rotatable carrier having a mold therewith to approach said open mold on the first carrier.

11. Glass blowing apparatus comprising laterally adjacent relatively eccentric first and second rotatable carriers, driving means effecting partial similar direction of rotation of the carriers, a stationary segment having its toothed portion extending downward toward the first carrier, guide means rotatably mounted on the first carrier and provided with a gear disposed to come into engagement with the segment, a mold carried by the outer portion of the guide means radially beyond the gear and reciprocable actuating means axially disposed in said guide means for opening the mold.

12. A blank orienting device for glass manufacturing apparatus embodying a rotatable carrier, a radial bearing mounted on the carrier, a sleeve in the bearing, a sectional mold carried by the sleeve, stationary means coacting with the sleeve between the mold and the end of the bearing remote from the carrier axis for rotating the sleeve and mold, a mold opening plunger through the sleeve, and means arranged to hold the plunger against mold opening movement while it contains a charge of glass, except during a limited region.

13. A blank orienting device for glassware machines embodying a rotatable carrier movable to successive operating stations including charging and transfer stations, a radial bearing mounted upon the carrier, a sleeve in said bearing, a sectional mold carried by the sleeve, a pinion on said sleeve between the mold and the end of the bearing remote from the axis of the carrier, a stationary rack adapted to engage the pinion for rotating the sleeve and mold, a mold opening plunger through the sleeve, and means arranged to hold the plunger against mold opening movement while at and after leaving the charging station, except during a limited region near the transfer station.

14. In a glass blowing machine, the combination of a blank mold table and a blank mold carried thereby, a blow mold table at one side of said blank mold table, a blow mold upon the blow table, means for opening the blank mold upon arriving at a predetermined position, means suspending the blank when released by said blank mold, means for positioning a blow mold about the suspended blank and means for releasing the supporting means.

15. In a glass blowing machine, the combination of a blank mold table and a blank mold carried thereby, a blow mold table at one side of said blank mold table, a blow mold upon the blow table, means for opening the blank mold upon arriving at a predetermined position, neck rings for suspending the blank when released by said blank mold, means for positioning a blow mold about the suspended blank and means for releasing the supporting means.

16. In a glass blowing machine, the combination of a blank mold table and a blank mold carried thereby, a blow mold table at one side of said blank mold table, a blow mold upon the blow table, means for opening the blank mold upon arriving at a predetermined position, neck rings for suspending the blank when released by said blank mold, means for positioning a blow mold about the suspended blank, means for releasing the supporting means and means operative following the release of the neck rings for blowing the article to final form in the blow mold.

17. In a glass blowing machine, the combination of a blank mold table and a blank mold carried thereby, a blow mold table at one side of said blank mold table, a blow mold upon the blow table, means for rotating said blank mold about a horizontal axis, means for opening the blank mold upon arriving at a predetermined position, means suspending the blank when released by said blank mold, means for positioning a blow mold about the suspended blank, and means for releasing the supporting means.

18. In a glassware forming machine comprising two mold supporting means rotatable in unison, divided molds carried thereby and movable in intersecting paths, divided neck rings associated with one of said molds and opening independently thereof, the molds carried by the other mold supporting means being located below the lower edge of said neck rings, the last mentioned molds and neck rings coinciding about a common vertical axis, and operating means respectively connected to said last mentioned molds and neck rings for actuating said molds and neck rings as said molds and neck rings are brought into transferring registry.

19. A glassware forming machine as defined in claim 18 wherein the two mold supporting means are rotatable about laterally spaced axes.

20. A glassware forming machine as defined in claim 18 wherein the neck rings and molds on the opposite supporting means are movable into axial transferring registry in synchronism.

21. A glassware forming machine as defined in claim 18 wherein the neck rings are opened and the molds on the opposite supporting means are closed by pneumatic motors.

22. In a glassware machine comprising a plurality of mold carriers movable in cyclical paths intersecting at a transfer point, axially divided molds supported by said carriers with their axes coinciding at the transfer point, the parts of said molds being hinged to separate on opposite sides at the transfer point, and said mold carriers being moved towards and away from said point in synchronism, means associated with one of said molds for embracing the neck of ware held therein, and means operating automatically to open said last mentioned mold to expose the ware therein upon arriving at the transfer point, means operating to close the opposite mold to embrace the ware and open said neck embracing means to release the ware, and means beyond the transfer station for blowing the bottle to finished form.

23. A glassware forming machine, comprising a blank mold support, a blank mold thereon adapted to be supported in inverted position while receiving its charge of glass, neck rings associated with the blank molds during the forming of the blank, means for opening the blank molds to expose the blank supported by the neck rings, a finishing mold, means for closing the finishing mold about the exposed parison, means for releasing the neck molds from the blank, and means operative after the release of the neck molds for blowing the article to final form in the finishing mold.

24. A glassware forming machine, comprising a blank mold support, a blank mold thereon adapted to be supported in inverted position while receiving its charge of glass, neck rings associated with the blank molds during the forming of the blank, means for opening the blank molds to expose the blank supported by the neck rings, a finishing mold, fluid pressure operated means for closing the finishing mold about the exposed parison, fluid pressure operated means for releasing the neck molds from the blank, and means operative after the release of the neck molds for blowing the article to final form in the finishing mold.

25. A glassware forming machine, comprising blank mold support, a blank mold thereon adapted to be supported in inverted position while receiving its charge of glass, neck rings associated with the blank molds during the forming of the blank, means for opening the blank molds to expose the blank supported by the neck rings, a finishing mold, means for closing the finishing mold about the exposed parison, means for releasing the neck molds from the blank, means for inverting the blank after the forming thereof and before the finish blowing of the article, and means operative after the release of the neck molds for blowing the article to final form in the finishing mold.

26. A glassware forming machine, comprising a blank mold support, a blank mold thereon adapted to be supported in inverted position while receiving its charge of glass, neck rings associated with the blank molds during the forming of the blank, means for rotating said blank mold about a horizontal axis to invert said mold to neck end up position, means for opening the blank molds to expose the blank supported by the neck rings, a finishing mold, means for closing the finishing mold about the exposed parison, means for releasing the neck molds from the blank, and means operative after the release of the neck molds for blowing the article to final form in the finishing mold.

27. A glassware forming machine comprising a rotatable mold carrier, a series of sectional blank molds mounted thereon and rotatable about a horizontal axis, means for rotating said molds and centering them in opposite vertical position, neck rings associated with said blank molds, means for opening the blank mold sections to expose the glass parison supported by said neck rings, a sectional finishing mold, means for closing the finishing mold around the supported parison, means for releasing the neck rings from the parison and means operative following the release of the neck rings for finishing the article in the finishing mold.

28. A glassware forming machine comprising a rotatable mold carrier, a series of sectional blank molds mounted thereon and rotatable about a horizontal axis, means effective during movement of the carrier for inverting said molds, neck rings associated with said blank molds, means for opening the blank mold sections to expose the glass parison supported by said neck rings, a sectional finishing mold, means for closing the finishing mold around the supported parison, means for releasing the neck rings from the parison and means operative following the release of the neck rings for finishing the article in the finishing mold.

29. A glassware forming machine comprising a rotatable mold carrier, a series of sectional blank molds mounted thereon and rotatable about a horizontal axis, gearing effective during movement of the molds for rotating them about a horizontal axis, neck rings associated with said blank molds, means for opening the blank mold sections to expose the glass parison supported by said neck rings, a sectional finishing mold, means for closing the finishing mold around the supported parison, means for releasing the neck rings from the parison and means operative folrings, and separate and independent means for closing the finishing molds around the suspended blank and opening the neck rings.

49. In a glassware forming machine, the combination of separable blank and blow molds movable in separate paths to successive operating positions and intersecting at a common point, neck rings associated with said blank molds during the forming of the blank, means for opening said blank mold to support the blank by the neck rings, means for closing the blow mold around the suspended blank, and means common to all of said neck rings for operating them to release the blanks into the blow molds.

EDWARD G. BRIDGES.